(12) United States Patent
Okada et al.

(10) Patent No.: US 6,914,087 B2
(45) Date of Patent: Jul. 5, 2005

(54) PROCESS FOR PRODUCING POWDER COATING COMPOSITION, POWDER COATING COMPOSITION, AND METHOD OF COATING FILM FORMATION

(75) Inventors: Katsuhiko Okada, Osaka (JP); Tetsuro Agawa, Osaka (JP); Kouji Shinohara, Nara (JP); Yoshitaka Konishi, Nara (JP)

(73) Assignees: Dainippon Ink and Chemicals, Inc., Tokyo (JP); Liquid Gas Co., Ltd., Osaka (JP)

( * ) Notice: Subject to any disclaimer, the term of this patent is extended or adjusted under 35 U.S.C. 154(b) by 294 days.

(21) Appl. No.: 09/926,632

(22) PCT Filed: Mar. 29, 2001

(86) PCT No.: PCT/JP01/02635

§ 371 (c)(1),
(2), (4) Date: Nov. 27, 2001

(87) PCT Pub. No.: WO01/72916

PCT Pub. Date: Oct. 4, 2001

(65) Prior Publication Data

US 2003/0083402 A1 May 1, 2003

(30) Foreign Application Priority Data

Mar. 29, 2000 (JP) .......................................... 2000-92314

(51) Int. Cl.[7] .............................. B05D 1/36; C08L 63/00
(52) U.S. Cl. ..................... 523/342; 523/401; 525/386; 427/202; 427/203; 427/386
(58) Field of Search ................................. 523/342, 401; 525/386; 427/202, 203, 386

(56) References Cited

U.S. PATENT DOCUMENTS 3,998,768 A * 12/1976 Pettit, Jr. ..................... 524/38
5,208,291 A    5/1993 Wamprecht et al. ........ 525/124
6,309,572 B1 * 10/2001 Isozaki et al. ............... 264/102
6,515,046 B2 * 2/2003 Okada et al. ................ 523/456

FOREIGN PATENT DOCUMENTS

| | | |
|---|---|---|
| EP | 0 962 472 | 12/1999 |
| JP | 63-267402 | 11/1988 |
| JP | 3-192128 | 8/1991 |
| JP | 8-503721 | 4/1996 |
| JP | 8-113652 | 5/1996 |
| JP | 9-255762 | 9/1997 |
| JP | 9-255895 | 9/1997 |
| JP | 10-53729 | 2/1998 |
| JP | 0 849 340 | 6/1998 |
| JP | 10-204332 | 8/1998 |
| JP | 11-349859 | 12/1999 |
| JP | 2000-34426 | 2/2000 |
| WO | WO 94/09913 | 5/1994 |

* cited by examiner

Primary Examiner—Tae H. Yoon
(74) Attorney, Agent, or Firm—Armstrong, Kratz, Quintos, Hanson & Brooks, LLP

(57) ABSTRACT

A powder coating is provided which does not require a long complicated production process, can be produced easily and with no danger of gelling occurring during production, and which forms a paint film with superior smoothness and with no film defects such as bubbles or pinholes. A powder coating raw materials solution comprising as essential constituents a room temperature solid main constituent resin (A) with a curable reactive group, a room temperature solid curing agent (B) which reacts with the curable reactive group of the main constituent resin (A), and an organic solvent (C), is spray dried at a temperature at which the main constituent resin (A) and the curing agent (B) undergo no substantial curing reaction.

17 Claims, No Drawings

PROCESS FOR PRODUCING POWDER COATING COMPOSITION, POWDER COATING COMPOSITION, AND METHOD OF COATING FILM FORMATION

TECHNICAL FIELD

The present invention relates to a production method for a powder coating, a powder coating, and a paint film formation method. In particular the present invention relates to a production method for a powder coating wherein a powder coating raw materials solution comprising as essential constituents a room temperature solid main constituent resin (A) with a curable reactive group, an associated curing agent (B), and an organic solvent (C) incorporating a high boiling point organic solvent (C1) with a boiling point at atmospheric pressure of 150 to 300° C., is spray dried at a temperature at which the main constituent resin (A) and the curing agent (B) undergo no substantial curing reaction, and under conditions where a portion of, or all of, the high boiling point organic solvent (C1) remains, as well as a powder coating incorporating the high boiling point solvent (C1), and a paint film formation method.

BACKGROUND ART

Powder coatings are widely used for the general painting of metals, as environmentally friendly paints which do not release organic solvents into the atmosphere during paint application.

Normally, a powder coating is produced by producing a main constituent resin, subjecting the resin to coarse crushing, and dry blending with a curing agent and various additives, and then subjecting the dry blend to extrusion mixing, cooling, a second crushing process, and classification. Compared with solvent based paints, the production process is long and complex, and consequently the problem arises of increased production cost. In order to resolve this problem, tests are being conducted on preparing a raw materials solution by dissolving or dispersing the raw materials, namely the main constituent resin, the curing agent and the various additives, in a solvent, and then removing the solvent to obtain the powder coating directly.

In such a case, in order to obtain the final product powder coating, a step for removing the solvent is necessary, although if during solvent removal the raw materials solution is heated to a high temperature, the main constituent resin and the curing agent undergo a curing reaction, resulting in gelling.

In contrast in Japanese Unexamined Patent Application, First Publication No. Hei 10-53729, a method is disclosed wherein a powder coating is obtained by using a specific continuous reduced pressure solvent removal apparatus to remove the solvent at a comparatively low temperature. However, the powder coating produced is lumpy, and in order to use the product as a paint, a fine grinding and classification process is necessary. Furthermore, there is also a possibility of localized heating inside the apparatus causing gelling during the solvent removal.

Methods of removing solvent from a powder coating raw materials solution by using a supercritical fluid have also been proposed (Japanese Unexamined Patent Application, First Publication No. Hei 8-113652 and Published Japanese Translation No. Hei 8-503721 of PCT International Publication), although in these methods, operations need to be performed under high pressure conditions, and so a problem arises in that the equipment required for production is extremely expensive, making the methods inappropriate for industrial production.

Another method for removing solvent is disclosed in Japanese Unexamined Patent Application, First Publication No. Hei 9-255895 and is a method for obtaining a powder coating by using a freeze drying method, but once again, problems arise with this method in that the energy costs are very high and the productivity low.

In addition to these methods, proposals have also been made which utilize spray drying for the removal of solvent. For example in Japanese Unexamined Patent Application, First Publication No. Hei 3-192128, a method is disclosed wherein a powder coating raw materials solution dispersed in water is spray dried to produce a powder. However in the case of this method, because a dispersant or the like must be used in order to disperse the powder coating raw materials solution in water, not only does the cost of the raw materials increase, but there is also a danger of a reduction in the storage stability of the paint, and reductions in the water resistance and chemical resistance of the formed paint film. Furthermore, because water, which has a large specific heat and a large latent heat of vaporization, is used as the medium, the thermal energy cost required in the drying process is also extremely high.

In contrast, in Japanese Unexamined Patent Application, First Publication No. Sho 63-267402, a method is disclosed in which a raw materials solution comprising a main constituent resin and a solvent is subjected to drying. However, in the case of this production method, because a high temperature solvent gas which has been heated to a superheated vapor state is used as the heat source gas, there is a danger that within the system comprising the main constituent resin and the curing agent, the powder coating raw materials will be exposed to high temperatures during the drying process, causing the main constituent resin and the curing agent to undergo a curing reaction which will result in a gelling of the paint, making it unusable as a powder coating.

Furthermore, generally a problem exists in spray drying methods in that hollow particles are easily generated, and so a problem of powder coatings that have been produced by spray drying is that, depending on the paint application conditions, bubbles, pinholes and the like may occur in the paint film.

In addition, in powder coatings produced by conventional mechanical crushing methods, the production method means that the mixing of the main constituent resin and the curing agent is always insufficient, and so the external appearance of the paint film is inferior when compared with solvent based paints. As a result, the use of powder coatings in applications requiring a superior paint film external appearance, including the use on automobiles, has been problematic.

DISCLOSURE OF INVENTION

However, the inventors of the present invention commenced extensive research aimed at achieving a production method for a powder coating, a powder coating, and a paint film formation method which would resolve the various problems and drawbacks of the conventional techniques described above, would not require a long complicated production process, would enable a powder coating to be produced easily and with no danger of gelling occurring during production, and would yield a powder coating capable of forming a paint film with superior smoothness and with no film defects such as bubbles or pinholes.

Consequently, an object of the present invention is to provide a production method for a powder coating, a powder coating and a paint film formation method, which do not require a long complicated production process, enable a powder coating to be produced easily and with no danger of gelling occurring during production, and yield a powder coating capable of forming a paint film with superior smoothness and with no film defects such as bubbles or pinholes.

As a result of extensive research into resolving the problems described above, the inventors discovered that when a powder coating raw materials solution comprising as essential constituents a room temperature solid main constituent resin (A) with a curable reactive group, an associated curing agent (B), and an organic solvent (C) incorporating a high boiling point organic solvent (C1) with a boiling point at atmospheric pressure of 150 to 300° C. was spray dried at a temperature at which the main constituent resin (A) and the curing agent (B) underwent no substantial curing reaction, and moreover under conditions where a portion of, or all of, the high boiling point organic solvent (C1) remained, then a powder coating could be produced easily and with no danger of gelling occurring during production, and moreover the powder coating obtained was capable of forming a paint film with superior smoothness and with no film defects such as bubbles or pinholes, and this enabled the inventors to complete the present invention.

In other words, the present invention provides a method of producing a powder coating, wherein spray drying a powder coating raw materials solution comprising as essential constituents a room temperature solid main constituent resin (A) with a curable reactive group, a room temperature solid curing agent (B) which reacts with the curable reactive group of the main constituent resin (A), and an organic solvent (C) incorporating a high boiling point organic solvent (C1) with a boiling point at atmospheric pressure of 150 to 300° C., at a temperature at which the main constituent resin (A) and the curing agent (B) undergo no substantial curing reaction, and moreover under conditions where a portion of, or all of, the high boiling point organic solvent (C1) remains, yields a powder coating in which the percentage content of the high boiling point organic solvent (C1) is from 0.005 to 1% by weight. Furthermore, the present invention also provides a powder coating comprising a room temperature solid main constituent resin (A) with a curable reactive group, a room temperature solid curing agent (B) which reacts with the curable reactive group of the main constituent resin (A), and a high boiling point organic solvent (C1) with a boiling point at atmospheric pressure of 150 to 300° C., wherein the percentage content of the high boiling point organic solvent (C1) is from 0.005 to 1% by weight. In addition, the present invention provides a paint film formation method for forming a paint film of a single layer or a plurality of layers on a target object for painting, wherein the aforementioned powder coating is used as a top coat paint.

BEST MODE FOR CARRYING OUT THE INVENTION

As follows is a specific description of details of the present invention.

First is a description of a main constituent resin (A) with a curable reactive group, which is one of the essential constituents of a powder coating raw materials solution used in a production method of the present invention.

Any of the resins normally used in powder coatings, such as acrylic resins, polyester resins and epoxy resins and the like, can be used for the main constituent resin (A), although of these resins, acrylic resins and polyester resins are preferred. Furthermore, in order to obtain a powder coating which displays a superior balance between storage stability and external appearance of the paint film, main constituent resins (A) with a softening point within the range from 80 to 150° C. are particularly preferred.

In cases where the main constituent resin (A) is an acrylic resin, known methods can be applied to the preparation of the main constituent acrylic resin, although a method wherein a vinyl monomer with a curable reactive group is used, together with other copolymerizable vinyl monomers where necessary, and these monomers are polymerized in an organic solvent is the most simple, and is therefore preferred. Known materials can be used for the polymerization initiator and the solvent used in this preparation method.

Examples of suitable curable reactive groups in the main constituent resin (A) include epoxy groups, carboxyl groups, hydroxyl groups, amide groups, amino groups, acid anhydride groups, and (block) isocyanate groups, although in terms of ease of production, at least one group selected from the group consisting of epoxy groups, carboxyl groups and hydroxyl groups is desirable. Of these groups, it is even more desirable if at least one type of curable reactive group is an epoxy group, as such groups offer superior storage stability and a superior paint film exterior appearance. In addition, the paint film external appearance improves even further in cases where the main constituent resin (A) contains an alicyclic epoxy group, and so it is particularly desirable that at least a portion of the epoxy groups are alicyclic epoxy groups.

Examples of particularly representative vinyl monomers with a curable reactive group, firstly in cases where the curable reactive group is an epoxy group, include monomers with an epoxy group such as glycidyl (meth) acrylate, β-methylglycidyl (meth) acrylate, glycidyl vinyl ether and allyl glycidyl ether; vinyl monomers with a (2-oxo-1,3-oxolane) group such as (2-oxo-1,3-oxolane) methyl (meth) acrylate; and vinyl monomers with an alicyclic epoxy group such as 3,4-epoxycyclohexyl (meth) acrylate, 3,4-epoxycyclohexylmethyl (meth) acrylate and 3,4-epoxycyclohexylethyl (meth) acrylate.

In cases where the curable reactive group is a carboxyl group, suitable monomers include monomers with a carboxyl group such as (meth) acrylic acid, crotonic acid, itaconic acid, maleic acid and fumaric acid; monoesters of an α,β-unsaturated dicarboxylic acid and a monohydric alcohol of 1 to 18 carbon atoms such as monomethyl fumarate, monoethyl fumarate, monobutyl fumarate, monoisobutyl fumarate, monotert-butyl fumarate, monohexyl fumarate, monooctyl fumarate, mono-2-ethylhexyl fumarate, monomethyl maleate, monoethyl maleate, monobutyl maleate, monoisobutyl maleate, monotert-butyl maleate, monohexyl maleate, monooctyl maleate and mono-2-ethylhexyl maleate; and monoalkyl itaconate esters such as monomethyl itaconate, monoethyl itaconate, monobutyl itaconate, monoisobutyl itaconate, monohexyl itaconate, monooctyl itaconate and mono-2-ethylhexyl itaconate.

In cases where the curable reactive group is a hydroxyl group, suitable monomers include (meth) acrylates with a hydroxyl group such as 2-hydroxyethyl (meth) acrylate, 2-hydroxypropyl (meth) acrylate, 3-hydroxypropyl (meth) acrylate, 2-hydroxybutyl (meth) acrylate, 3-hydroxybutyl (meth) acrylate, 4-hydroxybutyl (meth) acrylate, polyethylene glycol mono (meth) acrylate and polypropylene glycol mono (meth) acrylate; addition reaction products of the various aforementioned (meth) acrylates with ε-caprolactone; vinyl ethers with a hydroxyl group such as 2-hydroxyethyl vinyl ether, 3-hydroxypropyl vinyl ether, 2-hydroxypropyl vinyl ether, 4-hydroxybutyl vinyl ether, 3-hydroxybutyl vinyl ether, 2-hydroxy-2-methylpropyl vinyl ether, 5-hydroxypentyl vinyl ether and 6-hydroxyhexyl vinyl ether; addition reaction products of the various aforementioned vinyl ethers with ε-caprolactone; allyl ethers with a hydroxyl group such as 2-hydroxyethyl (meth) allyl ether, 3-hydroxypropyl (meth) allyl ether, 2-hydroxypropyl (meth) allyl ether, 4-hydroxybutyl (meth) allyl ether, 3-hydroxybutyl (meth) allyl ether, 2-hydroxy-2-methylpropyl (meth) allyl ether, 5-hydroxypentyl (meth) allyl ether and 6-hydroxyhexyl (meth) allyl ether; and addition reaction products of the various aforementioned allyl ethers with ε-caprolactone.

In addition, other copolymerizable vinyl monomers may also be used where necessary, and particularly representative examples of these other copolymerizable vinyl monomers include various acrylate esters such as methylacrylate, ethylacrylate, butylacrylate and cyclohexylacrylate; methacrylate esters such as methyl methacrylate, ethyl methacrylate, n-butyl methacrylate, iso-butyl methacrylate, tert-butyl methacrylate, cyclohexyl methacrylate and benzyl methacrylate; α-olefins such as ethylene, propylene and butene-1; halogenated olefins (haloolefins) with the exception of fluoroolefins such as vinyl chloride and vinylidene chloride; aromatic vinyl monomers such as styrene, α-methylstyrene and vinyltoluene; diesters of an unsaturated dicarboxylic acid with a monohydric alcohol of 1 to 18 carbon atoms, such as dimethyl fumarate, diethyl fumarate, dibutyl fumarate, dioctyl fumarate, dimethyl maleate, diethyl maleate, dibutyl maleate, dioctyl maleate, dimethyl itaconate, diethyl itaconate, dibutyl itaconate and dioctyl itaconate; amide based unsaturated monomers with an amino group such as N-dimethylaminoethyl (meth) acrylamide, N-diethylaminoethyl (meth) acrylamide, N-dimethylaminopropyl (meth) acrylamide and N-diethylaminopropyl (meth) acrylamide; dialkyl aminoalkyl (meth) acrylates such as dimethylaminoethyl (meth) acrylate and diethylaminoethyl (meth) acrylate; monomers with an amino group such as tert-butylaminoethyl (meth) acrylate, tert-butylaminopropyl (meth) acrylate, aziridinylethyl (meth) acrylate, pyrrolidinylethyl (meth) acrylate and piperidinylethyl (meth) acrylate; monomers with an acid anhydride group such as maleic anhydride, itaconic anhydride, citraconic anhydride, (meth) acrylic anhydride and tetrahydrophthalic anhydride; monomers with a phosphate ester group such as diethyl-2-(meth) acryloyloxyethyl phosphate, dibutyl-2-(meth) acryloyloxybutyl phosphate, dioctyl-2-(meth) acryloyloxyethyl phosphate and diphenyl-2-(meth) acryloyloxyethyl phosphate; monomers with a hydrolyzable silyl group such as γ-(meth) acryloyloxypropyl trimethoxysilane, γ-(meth) acryloyloxypropyl triethoxysilane and γ-(meth) acryloyloxypropyl methyldimethoxysilane; vinyl aliphatic carboxylates such as vinyl acetate, vinyl propionate, vinyl butyrate, vinyl isobutyrate, vinyl caproate, vinyl caprylate, vinyl caprate, vinyl laurate, vinyl branched aliphatic carboxylates of 9 carbon atoms, vinyl branched aliphatic carboxylates of 10 carbon atoms, vinyl branched aliphatic carboxylates of 11 carbon atoms and vinyl stearate; and vinyl esters of carboxylic acids with a cyclic structure such as vinyl cyclohexanecarboxylate, vinyl methylcyclohexanecarboxylate, vinyl benzoate and vinyl p-tert-butylbenzoate.

The amount of the above type of curable reactive group containing vinyl monomer used should preferably be within a range from 10 to 70% by weight of the total weight of vinyl monomers used. Provided the amount of curable reactive group containing monomer used falls within the above range, a paint film with superior mechanical properties and flexibility can be obtained.

Appropriate number average molecular weights for the main constituent acrylic resin (A) are within a range from 1000 to 20,000, with values in the range from 1500 to 15,000 being preferable. Provided the number average molecular weight of the main constituent acrylic resin (A) falls within the above range, a paint film of superior smoothness and with superior mechanical properties can be obtained.

There are no particular restrictions on the preparation method for producing a polyester resin for use as the main constituent resin (A), and a variety of common methods can be used, although in this invention the resin is produced by a method in which a polyhydric alcohol and a polybasic acid undergo condensation.

In terms of ease of preparation, carboxyl groups and/or hydroxyl groups are used in preference for the curable reactive group.

A variety of commonly used compounds can be used for the polyhydric alcohol and the polybasic acid used as raw materials for the polyester resin for use as the main constituent resin (A), and by adjusting the amounts of the polyhydric alcohol and the polybasic acid used, a polyester resin with a carboxyl group and/or a hydroxyl group can be obtained.

First, particularly representative examples of the aforementioned polyhydric alcohol include ethylene glycol, diethylene glycol, propylene glycol, dipropylene glycol, 1,3-butanediol, 1,4-butanediol, 1,5-pentanediol, 1,6-hexanediol, neopentyl glycol, triethylene glycol, bis-hydroxyethylterephthalate, cyclohexanedimethanol, octanediol, diethylpropanediol, butylethylpropanediol, 2-methyl-1,3-proanediol, 2,2,4-trimethylpentanediol, hydrogenated bisphenol A, the addition product of hydrogenated bisphenol A and ethylene oxide, the addition product of hydrogenated bisphenol A and propylene oxide, trimethylolethane, trimethylolpropane, glycerine, pentaerythritol, trishydroxyethylisocyanurate and hydroxypivalylhydroxypivalate.

On the other hand, particularly representative examples of the aforementioned polybasic acid include terephthalic acid, isophthalic acid, phthalic acid, methylterephthalic acid, trimellitic acid and pyromellitic acid, or acid anhydrides thereof; succinic acid, adipic acid, azelaic acid and sebacic acid, or acid anhydrides thereof; maleic acid and itaconic acid or acid anhydrides thereof; fumaric acid, tetrahydrophthalic acid, methyltetrahydrophthalic acid, hexahydrophthalic acid and methylhexahydrophthalic acid, or acid anhydrides thereof; and cyclohexanedicarboxylic acid and 2,6-naphthalenedicarboxylic acid.

In addition, other suitable materials which can be used as raw materials for a polyester resin include compounds with both a carboxyl group and a hydroxyl group within a single molecule such as dimethanolpropionic acid and hydroxypivalate; monoepoxy compounds such as "Cardura E10" (the brand name for a glycidyl ester of a branched aliphatic carboxylic acid, manufactured by Shell Corporation of Holland); monohydric alcohols such as methanol, propanol, butanol and benzyl alcohol; monovalent basic acids such as benzoic acid and p-tert-butylbenzoic acid; and fatty acids such as castor oil fatty acids, coconut oil fatty acids and soybean oil fatty acids.

Of the polyester resins prepared using the types of polyhydric alcohols, polybasic acids and other raw materials described above, the use of resins for which the total of the acid value and the base value is within a range from 10 to 250 (mgKOH/g; hereafter the same), and for which the number average molecular weight is within a range from 500 to 10,000 is particularly desirable.

If the total of the acid value and the base value is within the above range, then a paint film of superior smoothness and with superior mechanical properties can be obtained. Moreover, if the number average molecular weight is within the above range, then a paint film can be obtained which not only displays superior smoothness and superior mechanical properties, but also offers superior storage stability.

There are no particular restrictions on the structure of the polyester resin, provided the characteristic values of the aforementioned resin properties are within the identified ranges, and both branched structures and linear structures are suitable.

There are no particular restrictions on the epoxy resins which can be used as the aforementioned main constituent resin (A), and a suitable example of such an epoxy resin is the polyglycidyl ether of bisphenol A.

Next is a description of the curing agent (B).

The curing agent (B) used in the present invention can be suitably selected from materials typically used in powder coatings, in accordance with the type of curable reactive group of the main constituent resin (A).

Particularly representative examples of the curing agent (B) in those cases where the curable reactive group of the main constituent resin (A) is an epoxy group include succinic acid, glutaric acid, adipic acid, pimelic acid, suberic acid, azelaic acid, sebacic acid, dodecanedioic acid, eicosanedicarboxylic acid, maleic acid, citraconic acid, itaconic acid, glutaconic acid, phthalic acid, tetrahydrophthalic acid, hexahydrophthalic acid, cyclohexene-1,2-dicarboxylic acid, trimellitic acid and pyromellitic acid, or acid anhydrides of these acids, and of these materials, aliphatic dibasic acids are preferred due to their superior paint film properties and storage stability, with dodecanedioic acid being particularly desirable due to the particularly superior paint film properties it offers.

Furthermore, particularly representative examples of the curing agent (B) in those cases where the curable reactive group of the main constituent resin (A) is a carboxyl group include various epoxy resins such as the polyglycidyl ether of bisphenol A; epoxy group containing acrylic resins such as acrylic resins with a glycidyl group; polyglycidyl ethers of the various polyhydric alcohols such as 1,6-hexanediol, trimethylolpropane and trimethylolethane; polyglycidyl ethers of the various polyhydric carboxylic acids such as phthalic acid, terephthalic acid, isophthalic acid, hexahydrophthalic acid, methylhexahydrophthalic acid, trimellitic acid and pyromellitic acid; various alicyclic epoxy group containing compounds such as bis (3,4-epoxycyclohexyl) methyl adipate; and triglycidylisocyanurate.

Particularly representative examples of the curing agent (B) in those cases where the curable reactive group of the main constituent resin (A) is a hydroxyl group include poly(blocked isocyanate) compounds and aminoplasts and the like.

Particularly representative examples of poly(blocked isocyanate) compounds include organic diisocyanates such as the various aliphatic diisocyanates such as hexamethylene diisocyanate and trimethylhexamethylene diisocyanate; various cyclic aliphatic diisocyanates such as xylylene diisocyanate and isophorone diisocyanate; and the various aromatic diisocyanates such as tolylene diisocyanate and 4,4'-diphenylmethane diisocyanate; or addition products of these organic diisocyanates with a polyhydric alcohol, a low molecular weight polyester resin (polyester polyol) or water; as well as polymers formed between the organic diisocyanates described above (including isocyanurate type polyisocyanate compounds), materials obtained by blocking various polyisocyanate compounds such as isocyanate biurets with commonly used blocking agents, and so-called self blocking polyisocyanate compounds containing a urethodione linkage represented by the formula below as a structural unit.

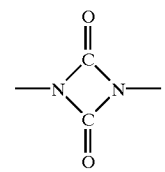

On the other hand, examples of aminoplasts include the condensation products obtained by reacting an amino group containing compound such as melamine, urea, acetoguanamine, benzoguanamine, stearoguanamine or spiroguanamine with an aldehyde based compound such as formaldehyde, paraformaldehyde, acetoaldehyde or glyoxal using commonly used methods, or alternatively, compounds obtained by etherification of these condensation products with an alcohol.

Particularly representative examples of the above types of aminoplasts include hexamethoxymethylolmelamine, hexabutyl etherified methylolmelamine, methyl butyl mixed etherified methylolmelamine, methyl etherified methylolmelamine, n-butyl etherified methylolmelamine, and isobutyl etherified methylolmelamine, or the condensates thereof; double ring compounds such as hexamethoxyglycoluril, hexabutoxyglycoluril and tetramethoxymethylglycoluril; various acid amides obtained by condensation reactions of an aliphatic dibasic acid and an alkanolamine such as diethanolamine; and various high molecular compounds such as those obtained by either a polymerization of a polymerizable monomer such as the butyl ether of N-methylolacrylamide, or a copolymerization reaction of such a monomer with other copolymerizable monomers.

The aforementioned hexamethoxymethylolmelamine is marketed under the brand names "Cymel 300, 301 and 303" (manufactured by Mitsui Cyanamid), the methyl butyl mixed etherified methylolmelamine is marketed under the brand names "Cymel 238, 232, and 266" (manufactured by Mitsui Cyanamid), the n-butyl etherified methylolmelamine is marketed under the brand name "Super Beckamine L-164" (manufactured by Dainippon Ink Chemical Industries Ltd.), the tetramethoxymethylglycoluril is marketed under the brand name "Powderlink 1174" (manufactured by American Cyanamid from the United States of America), and the acid amides are marketed under the brand names "Primid XL-552" and "Primid QM-1260".

The curing agents (B) described above can be used singularly, or in combinations of two or more materials.

The relative proportions of the curable reactive group of the main constituent resin (A) and the curing agent (B) should preferably be such that the equivalence ratio of the amount of the curable reactive group of the main constituent resin (A) per equivalent of the curing agent (B) is between 2.0 and 0.5 Next is a description of the organic solvent (C) used in the present invention. Solvents which dissolve the main constituent resin (A) and/or the curing agent (B) can be used as the organic solvent (C), and either one, or a combination of two or more solvents may be used. Of such solvents, solvents which dissolve both the main constituent resin (A) and the curing agent (B) are preferred. In cases where the main constituent resin (A) is a resin obtained by a solution polymerization, the solvent used during the polymerization of the main constituent resin (A) can also be used as either a portion of, or all of the organic solvent (C).

The powder coating raw materials solution used in the present invention should preferably comprise the main constituent resin (A) and the curing agent (B) completely dissolved in the organic solvent (C) at a temperature no greater than the temperature used during spray drying, and preferably at a temperature lower than that used during spray drying, for example normal room temperature.

In those cases where the main constituent resin (A) and the curing agent (B) dissolve completely in the organic solvent (C), the main constituent resin and the curing agent are mixed more uniformly than in the molten mixing used in conventional production methods, and consequently a powder coating can be obtained which forms a paint film with superior paint film properties, including the external appearance of the paint film.

Even a solvent which does not dissolve both the main constituent resin (A) and the curing agent (B) can be used provided it does not impair the storage stability of the powder coating raw materials solution.

In addition, the organic solvent (C) incorporates a high boiling point solvent (C1) with a boiling point at atmospheric pressure of 150 to 300° C. By using the high boiling point organic solvent (C1) as a portion of the organic solvent (C), a powder coating can be obtained which will form a paint film free of film defects such as bubbles or pinholes. The high boiling point organic solvent (C1) may comprise a single constituent, or may also be a mixture of a plurality of constituents.

The boiling point at atmospheric pressure of the high boiling point organic solvent (C1) should be between 150 and 300° C., with solvents with boiling points from 150 to 250° C. being used in preference. In addition, solvents for which the boiling point at atmospheric pressure exceeds by +5 to +150° C. the temperature used when the powder coating obtained by a production method of the present invention is baked and cured are particularly preferred.

The amount of the high boiling point organic solvent (C1) used should preferably be within a range from 0.005 to 2 parts of solvent relative to 100 parts of solid matter within the powder coating raw materials solution, with amounts from 0.005 to 1 part being even more desirable.

Provided the boiling point at atmospheric pressure of the high boiling point organic solvent (C1), and the amount of the solvent used are within the aforementioned ranges, a suitable quantity of the high boiling point organic solvent (C1) will remain in the powder coating obtained using a production method of the present invention, enabling the prevention of paint film defects such as bubbles or pinholes when the paint is baked and cured.

Particularly representative examples of the high boiling point organic solvent (C1) include alcohols such as n-hexanol, n-octanol, 2-ethylhexanol, cyclohexanol and benzyl alcohol; polyhydric alcohols such as ethylene glycol, propylene glycol and glycerine; glycol ethers such as butyl cellosolve, hexyl cellosolve, ethylene glycol dipropyl ether, ethylene glycol dibutyl ether, propylene glycol monobutyl ether, propylene glycol dipropyl ether, propylene glycol dibutyl ether, methyl carbitol, ethyl carbitol, diethylene glycol dimethyl ether, diethylene glycol diethyl ether, diethylene glycol dipropyl ether and diethylene glycol dibutyl ether; aromatic hydrocarbons such as propylbenzene, butylbenzene, pentylbenzene, diethylbenzene, dipropylbenzene, dipentylbenzene, dodecylbenzene and cyclohexylbenzene; mixed hydrocarbons containing aromatic hydrocarbons such as Solvesso 100, Solvesso 150 and Solvesso 200 (all manufactured by Exxon Corporation, United States of America); mixed hydrocarbons containing aliphatic hydrocarbons such as Exxon Naphtha No. 3, Exxon Naphtha No. 5, Exxon Naphtha No. 6, Exxon Solvent No. 7, Isopar G, Isopar H, Isopar L, Isopar M, Exxsol D 40, Exxsol D 90, Exxsol D 110 (all manufactured by Exxon Corporation, United States of America), IP Solvent 1620, IP Solvent 2028 (manufactured by Idemitsu Petrochemicals Ltd.), Merveille 20, Merveille 30, Merveille 40 (manufactured by Showa Shell Sekiyu K.K. Ltd.) and mineral spirit; glycerine alkyl ethers and glycerine alkyl esters; ketones such as diisobutyl keton , methyl amyl ketone, cyclohexanone, and isophorone; esters such as 2-ethylbutyl acetate, 2-ethylhexyl acetate, cyclohexyl acetate, isoamyl propionate, alkyl butyrate esters, alkyl stearate esters, alkyl benzoate esters, alkyl adipate esters and dialkyl phthalate esters; and N-methylpyrrolidone, dimethyl formamide, dimethyl acetamide and ethylene carbonate.

Of the high boiling point organic solvents (C1) listed above, aromatic based solvents and/or aliphatic based solvents offer a more marked paint film defect prevention effect, and are consequently used in preference.

There are no particular restrictions on the method used for adding the high boiling point organic solvent (C1) to the powder coating raw materials solution, although methods including addition as part of the solvent used for the polymerization of the main constituent resin, addition following completion of the polymerization of the main constituent resin, or addition immediately prior to the spray drying of the powder coating raw materials solution are the most convenient and are therefore recommended.

In addition to the high boiling point organic solvent (C1) described above, the organic solvent (C) can utilize many of the commonly used organic solvents.

Particularly representative examples of the organic solvent (C) include alkyl alcohols such as methanol, ethanol, n-propanol, isopropanol, n-butanol, isobutanol, sec-butanol, tert-butanol, n-pentanol and isopentanol; glycol ethers such as methyl cellosolve, ethyl cellosolve, ethylene glycol dimethyl ether, ethylene glycol diethyl ether, propylene glycol monomethyl ether, propylene glycol monoethyl ether, propylene glycol monopropyl ether, propylene glycol dimethyl ether and propylene glycol diethyl ether; aromatic hydrocarbons such as benzene, toluene, xylene and ethylbenzene; mixed hydrocarbons containing aromatic hydrocarbons such as Exxon Aromatic Naphtha No. 2 (manufactured by Exxon Corporation, United States of America); aliphatic hydrocarbons such as n-pentane, n-hexane and n-octane; mixed hydrocarbons containing aliphatic hydrocarbons such as Isopar C, Isopar E, Exxsol DSP 100/140, Exxsol D30 (all manufactured by Exxon Corporation, United States of America) and IP Solvent 1016 (manufactured by Idemitsu Petrochemicals Ltd.); alicyclic hydrocarbons such as cyclopentane, cyclohexane, methylcyclohexane and ethylcyclohexane;

ethers such as tetrahydrofuran, dioxane, diisopropyl ether and di-n-butyl ether; ketones such as acetone, methyl ethyl ketone and methyl isobutyl ketone; and esters such as methyl acetate, ethyl acetate, n-propyl acetate, isopropyl acetate, n-butyl acetate, isobutyl acetate, n-amyl acetate, isoamyl acetate, hexyl acetate, ethyl propionate and butyl propionate.

From the viewpoint of improving the drying properties of the paint particles during the spray drying process, it is preferable that the solvent component of the organic solvent (C) excluding the high boiling point organic solvent (C1) should comprise from 65 to 100% by weight of solvents with a boiling point at atmospheric pressure of no more than 100° C.

Furthermore in the case where the curing agent (B) is an aliphatic dibasic acid, then in order to improve the solubility of the curing agent, it is preferable that the organic solvent (C) comprises at least one alcohol of no more than 4 carbon atoms, and moreover that the amount of the alcohol of no more than 4 carbon atoms, relative to the amount of the dibasic acid incorporated within the powder coating raw materials solution, should be a weight ratio of at least four fold.

Moreover where necessary, pigments (D), other resins, curing catalysts and other additives and the like may be added to the powder coating raw materials solution, and either dissolved or dispersed before manufacturing the paint.

Particularly representative examples of pigments (D) include various inorganic pigments such as titanium dioxide, red iron oxide, chrome titan yellow, yellow iron oxide and carbon black; various commonly used organic pigments including phthalocyanine based pigments such as phthalocyanine blue and phthalocyanine green, anthraquinone based pigments such as indathrene blue and dianthraquinonyl red, quinacridone based pigments, azo based pigments such as lake red, fast yellow, disazo yellow and permanent red, nitro based pigments such as naphthol yellow, and nitroso based pigments such as pigment green B and naphthol green; various commonly used extender pigments; as well as various commonly used luminescent (metallic) pigments such as aluminum flakes and mica flakes.

By dispersing pigments (D) such as those listed above in the powder coating raw materials solution and then carrying out spray drying, colored powder coating can be prepared. Commonly used methods such as a sand mill or the like can be used for dispersing the pigment (D) in the powder coating raw materials solution. Furthermore, the coloring can be adjusted by mixing a plurality of colored powder coating raw materials solutions to form a colored powder coating raw materials solution of the desired target color, which can then be subjected to spray drying to produce the desired colored powder coating.

Particularly representative examples of other resins include acrylic resins, polyester resins, fluororesins, silicon resins, or resins such as chlorinated polyethylene, chlorinated polypropylene, petroleum resin, epoxy resin or chlorinated rubber, and such resins are in addition to the main constituent resin (A) and the curing agent (B).

In terms of curing catalysts, commonly used catalysts can be used as normal, in accordance with the particular combination of the main constituent resin (A) and the curing agent (B).

Examples of additives include the common additives such as flow regulators, color separation prevention agents, antioxidants, ultraviolet absorption agents, light stabilizers and silane coupling agents. These additives may, or may not comprise a curable reactive group. In cases where an additive does comprise a curable reactive group, there are no particular restrictions on that curable reactive group, and additives with the same curable reactive group as the main constituent resin (A) can also be used.

Moreover where necessary, the various cellulose derivatives such as nitrocellulose and cellulose acetate butyrate may also be used.

Next is a description of the spray drying apparatus. The apparatus used in the spray drying process can be any apparatus capable of removing organic solvents from the sprayed powder coating raw materials solution, and typically utilizes a spray drying apparatus which volatilizes the organic solvents through contact of the sprayed powder coating raw materials solution with a heat source gas, although because the spray drying apparatus volatilizes organic solvents, the apparatus should preferably have explosion proof specifications. Furthermore, from the viewpoint of maintaining a low volume of organic solvent vapor in the heat source gas used for drying the sprayed powder coating raw materials solution, a solvent recovery apparatus should preferably be provided.

There are no particular restrictions on the system used for bringing the powder coating raw materials solution in contact with the heat source gas, and any of the typical systems such as co-current systems, counter-current systems, or co-current/counter-current mixed systems may be used.

Similarly, the spray system for the powder coating raw materials solution can utilize any of the commonly used systems such as rotary disc systems, two fluid nozzle systems or pressure nozzle systems. The factors controlling the particulate diameter during the spraying process include the rotational speed in the case of a rotary disc system, the discharge speed from the nozzle and the mixing ratio of the raw materials solution and the compressed air mixed with the raw materials solution in the case of a two fluid nozzle system, and the discharge pressure in the case of a pressure nozzle system, and the values of these factors can be determined in accordance with the target particulate diameter.

The supply speed for the raw materials solution and the flow rate for the heat source gas can also be determined in accordance with the target particulate diameter, although if the supply speed of the raw materials solution or the flow rate of the heat source gas varies during the spray drying process, then the particulate diameter of the obtained particles, the particulate distribution and the value of the non-volatile component will also vary, and so it is preferable that these supply rates are maintained at a uniform level during the spray drying process.

Normally, the heat source gas containing the particles obtained from the spray drying is subsequently guided into a classification device such as a cyclone, where collection and classification of the particles is carried out.

The heat source gas should preferably be an inert gas. Of the inert gases, the use of nitrogen gas is desirable from a cost viewpoint. The temperature of the heat source gas should be set at a temperature where the main constituent resin (A) and the curing agent (B) undergo no substantial curing reaction, in other words within a temperature range wherein even if a curing reaction partially proceeds, there is no substantial deterioration in the paint properties of the produced powder coating. There are no particular restrictions on the lower limit of the temperature of the heat source gas, although in order to ensure efficient vaporization of the solvent, the temperatures should be set to at least 30° C., and preferably more than 40° C. Normally the temperature of the heat source gas should be suitably set within a range from 30 to 160° C., with temperatures in a range from 40 to 130° C. being even more desirable. For example, in the case where the main constituent resin (A) is an epoxy group containing acrylic resin and the curing agent (B) is an acid group containing compound, the temperature should be set at a temperature from 30° C. to 100° C., and in the case where the main constituent resin (A) is a hydroxyl group containing resin and the curing agent (B) is a poly(blocked isocyanate) compound or an aminoplast, the temperature should be set at a temperature from 40 to 130° C. The flow rate for the heat source gas and the supply speed for the powder coating raw materials solution can be suitably adjusted in accordance with the desired target particulate diameter, under conditions which ensure that the non-volatile component of the produced particles is at least 99% by weight. There are no particular restrictions on the pressure inside the apparatus, which may be at normal pressure, reduced pressure or may be pressurized.

Furthermore, the concentration of the non-volatile component in the powder coating raw materials solution at the time of spray drying may be suitably determined in accordance with the specifications of the spray drying apparatus, and the conditions under which the spray drying is conducted.

In addition, in order to improve the efficiency of the solvent volatilization, the powder coating raw materials solution may be preheated prior to the spray drying process. In such cases, the temperature of the preheating should preferably be no more than 70° C. in order to prevent gelling of the powder coating raw materials solution, and furthermore the spray drying should preferably be conducted as promptly as possible following the preheating.

The thus obtained powder coating can be used as is, as a powder coating, although where necessary, secondary drying by another drying method such as vacuum drying may also be carried out. In such cases, in order to prevent gelling of the powder coating, the secondary drying should preferably be conducted at a temperature of no more than approximately 70° C.

Furthermore the particulate diameter of the obtained powder coating may also be adjusted where necessary, using either a crushing process or a granulation process.

Powder coatings of the present invention can then be applied to a wide range of uses including the finishing coat for vehicles, intermediate coats for vehicles, as well as the paint for vehicle components, construction materials, household electrical appliances, and various metallic products.

Of these uses, powder coatings of the present invention can be ideally used as a top coat paint in a paint film formation method wherein a single layer or a plurality of layers of a paint film are formed on a target object for painting, and can be particularly ideally applied as a top coat paint (II) in a paint film formation method wherein a base coat paint (I) is painted onto a target object for painting, and the top coat paint (II) is then painted thereon. Furthermore it is even more desirable if the base coat paint (I) is a colored base coat paint and the top coat paint (II) is a transparent top coat paint.

In the above description, the term target object for painting refers to a base material to which a paint is to be applied, and specifically refers to an unpainted metallic material such as an unpainted steel sheet, or an untreated or chemical conversion treated aluminum base material, and includes the base materials used in road vehicles such as vehicle bodies and two wheeled vehicle bodies, and the base materials used in vehicle components such as aluminum wheels, and furthermore also includes base materials used in road vehicles such as vehicle bodies, where an electrodeposition coating has been applied. Other examples of suitable materials include the base materials used in household electrical appliances, automatic vending machines and steel furniture and the like, such as electrogalvanized steel sheets and hot dip zinc coated steel sheets.

These base materials may be already processed into shapes corresponding with their final uses, or may be in a form suitable for a PCM (precoat metal) painting method, in other words generally a cut flat sheet base material, with the material then being bent into a predetermined target shape following the formation of a plurality of layers of paint films using a method according to the present invention, and moreover base materials used in painting systems provided in after processing such as coil coating are also suitable.

Furthermore where necessary, materials in which a paint film of an intermediate paint has been formed on the above type of base material, can also be suitably used.

In this description, an intermediate paint is a coat of paint which is applied to an aforementioned base material in order to improve the smoothness, chipping resistance or the interlayer adhesion of the final multiple layered paint film, and examples of such intermediate paints include organic solvent type, non-aqueous dispersion type, powdery type, water soluble type, or water dispersion type thermosetting paints or room temperature setting paints, comprising a main constituent such as an alkyd resin, a polyester resin, an acrylic resin, an epoxy resin or a cellulose resin, with a curing agent constituent such as an amino resin or a polyisocyanate compound.

The aforementioned base coat paint (I) refers to a paint which uses mainly water or an organic solvent as the solvent medium. Representative examples of such paints which use water as the medium include (1) paints with a water based resin as a binder, (2) paints with a dispersion type resin as a binder, and (3) paints with an emulsion polymer as a binder. The type (1) paints include paints prepared by incorporating an acid group within an acrylic resin by copolymerization of a vinyl monomer with a carboxyl group, followed by an amine neutralization to make the paint completely water soluble; the type (2) paints include water dispersible polyurethane resins with anion forming groups (as disclosed in Japanese Examined Patent Application, Second Publication No. Hei 3-45755); and the type (3) paints include paints comprising aqueous solutions of emulsion polymers containing fine particles of cross-linked polymers (as disclosed in Japanese Unexamined Patent Application, First Publication No. Sho 56-157358).

Representative examples of paints utilizing an organic solvent medium include paints produced by combining an organic solvent solution of a macromolecule soluble in organic solvents such as toluene or xylene or the like, for example a vinyl resin with a hydroxyl group, with an aminoplast, a polyisocyanate or a blocked polyisocyanate or the like which will react with the hydroxyl group of the vinyl copolymer.

Of these base coat paints (I), paints in which mainly water or an organic solvent are used as the medium, and which are produced by combining a vinyl copolymer with a hydroxyl group, and an aminoplast, a polyisocyanate or a blocked polyisocyanate or the like which will react with the hydroxyl group of the vinyl copolymer, are preferred, and of these preferred paints, paints produced by combining a vinyl copolymer with a hydroxyl group and an aminoplast are particularly preferred as they offer a significant improvement in the adhesion with the target object being painted.

These base coat paints (I) with either a water or an organic solvent medium, in addition to these resin components, may also incorporate inorganic pigments or extender pigments such as titanium dioxide, as well as organic pigments or luminescent (metallic) pigments such as aluminum flakes or mica flakes or the like, and additives such as curing accelerators and leveling agents.

For the top coat paint (II) painted on top of the base coat paint, a powder coating (X2) of the present invention containing 0.001 to 1% by weight of a high boiling point organic solvent (C1) is ideal. By using the powder coating (X2), a paint film can be obtained with no paint film defects such as pinholes.

In addition, by using a powder coating (X1) produced using a production method of the present invention, namely by spray drying a powder coating raw materials solution comprising as essential constituents a room temperature solid main constituent resin (A) with a curable reactive group, a room temperature solid curing agent (B) which reacts with the curable reactive group of the main constituent resin (A), and an organic solvent (C) incorporating a high boiling point organic solvent (C1) with a boiling point at atmospheric pressure of 150 to 300° C., at a temperature at which the main constituent resin (A) and the curing agent (B) undergo no substantial curing reaction, and moreover under conditions where a portion of, or all of, the high boiling point organic solvent (C1) remains, a paint film can be obtained which has no paint film defects, and which moreover displays superior smoothness.

The top coat paint (II) in the present invention includes non-transparent paints, but transparent top coat paints are preferred, particularly in cases where the base coat paint (I) is a colored base coat paint. These transparent top coat paints may be colored with a pigment (D) provided the paint remains transparent.

As described above, powder coatings obtained by a production method of the present invention and powder coatings of the present invention, by application to the aforementioned type of target base materials using normal methods, and subsequent baking and drying by normal methods, are able to produce paint films which offer superior properties, particularly in terms of curability, external appearance, weather resistance and mechanical properties.

EXAMPLES

As follows, the present invention is described more specifically using a series of reference examples, working examples and comparative examples, although it should be noted that the present invention is, of course, not limited to the examples listed below. In the following description, unless otherwise stated, the term "parts" refers to "parts by weight".

Reference Example 1 (Preparation of a Main Constituent Acrylic Resin (A))

In a reaction vessel equipped with a stirrer, a thermometer, a condenser and a nitrogen gas inlet was placed 1800 parts of xylene, and the temperature was raised to 135° C. under an atmosphere of nitrogen. A mixture of 1890 parts of methyl methacrylate, 810 parts of n-butyl methacrylate, 300 parts of 2-hydroxyethyl methacrylate, 210 parts of tert-butylperoxyoctoate, 15 parts of di-tert-butylperoxide and 600 parts of xylene was then dripped into the reaction vessel over a period of six hours. Following completion of the addition, the same temperature was maintained for a further five hours to complete the polymerization reaction, and yielded a solution (A'-1) (non-volatile component 56.9%) of a main constituent resin (A-1) with a hydroxyl value of 40 (mg-KOH/g) and a number average molecular weight of 2200. The properties of the resin are shown in Table 1(1).

Reference Examples 2, 3 (As Above)

With the exception of the alterations in the monomers, the polymerization initiator, the solvent and the polymerization temperature shown in Table 1(1) and Table 1(2), solutions (A'-2) and (A'-3) of main constituent acrylic resins (A-2) and (A-3) were obtained using the same method described in the reference example 1. The properties are shown in Table 1(1) and Table 1(2).

Reference Example 4 (As Above)

In a reaction vessel equipped with a stirrer, a thermometer, a condenser and a nitrogen gas inlet was placed 1800 parts of xylene, and 8.0 parts of "Solvesso 150" (a mixed hydrocarbon based solvent containing aromatic hydrocarbons manufactured by Exxon Corporation, United States of America) as the high boiling point organic solvent (C1), and the temperature was then raised to 135° C. under an atmosphere of nitrogen. A mixture of 900 parts of styrene, 390 parts of methyl methacrylate, 510 parts of n-butyl methacrylate, 1050 parts of glycidyl methacrylate, 150 parts of 3,4-epoxycyclohexylmethyl methacrylate, 180 parts of tert-butylperoxyoctoate, 15 parts of di-tert-butylperoxide and 600 parts of xylene was then dripped into the reaction vessel over a period of six hours. Following completion of the addition, the same temperature was maintained for a further five hours to complete the polymerization reaction, and yielded a solution (A'-4) (non-volatile component 57.1%) of a main constituent resin (A-4) with an epoxy equivalence of 395 (g/equivalent) and a number average molecular weight of 2400. The properties of the resin are shown in Table 1(2).

Reference Example 5 (As Above)

1800 parts of methyl ethyl ketone was placed in a stainless steel autoclave in which the air inside had been replaced with nitrogen, and the temperature was raised to 135° C. A mixture of 1470 parts of methyl methacrylate, 330 parts of n-butyl methacrylate, 1200 parts of glycidyl methacrylate, 225 parts of tert-butylperoxyoctoate and 600 parts of methyl ethyl ketone was then dripped into the autoclave over a period of six hours. Following completion of the addition, the same temperature was maintained for a further five hours to complete the polymerization reaction, and yielded a solution (A'-5) (non-volatile component 57.5%) of a main constituent acrylic resin (A-5) with an epoxy equivalence of 385 and a number average molecular weight of 2300. The properties of the resin are shown in Table 1(3).

Reference Example 6 (As Above)

With the exception of the alterations in the monomers, the polymerization initiator, the solvent and the polymerization temperature shown in Table 1(3), a solution (A'-6) of a main constituent acrylic resin (A-6) was obtained using the same method described in the reference example 1. The properties are shown in Table 1(3).

TABLE 1(1)

| | Reference Example | |
| --- | --- | --- |
| | 1 | 2 |
| Name of main constituent resin solution | A'-1 | A'-2 |
| Monomers | | |
| styrene | — | 420 |
| methyl methacrylate | 1890 | 1200 |
| n-butyl methacrylate | 810 | 990 |
| 2EHA | — | 150 |
| HEMA | 300 | — |

TABLE 1(1)-continued

| | | | |
|---|---|---|---|
| methacrylic acid | | — | 240 |
| Polymerization | TBPO | 210 | 225 |
| initiator | DTBP | 15 | — |
| Solvent | | Xy | Xy/BuAc = 9/1 |
| Polymerization temperature (° C.) | | 135 | 125 |
| Properties | | | |
| Hydroxyl value of the resin | | 40 | — |
| Acid value of the resin | | — | 48 |
| Number average molecular weight of the resin | | 2,200 | 2,800 |
| Non-volatile component of the solution (%) | | 56.9 | 57.5 |

TABLE 1(2)

| | Reference Example | |
|---|---|---|
| | 3 | 4 |
| Name of main constituent resin solution | A'-3 | A'-4 |
| Monomers | | |
| styrene | 450 | 900 |
| methyl methacrylate | 900 | 390 |
| n-butyl methacrylate | 300 | 510 |
| glycidyl methacrylate | 1350 | 1050 |
| ECHMMA | — | 150 |
| Polymerization initiator TBPO | 240 | 180 |
| DTBP | — | 15 |
| High boiling point solvent (C1) Solvesso 150 | — | 8.0 |
| Solvent | Xy | Xy |
| Polymerization temperature (° C.) | 135 | 135 |
| Properties | | |
| Epoxy equivalence of the resin | 345 | 395 |
| Number average molecular weight of the resin | 2,100 | 2,400 |
| Non-volatile component of the solution (%) | 57.2 | 57.1 |

TABLE 1(3)

| | Reference Example | |
|---|---|---|
| | 5 | 6 |
| Name of main constituent resin solution | A'-5 | A'-6 |
| Monomers | | |
| styrene | — | 600 |
| methyl methacrylate | 1470 | 420 |
| n-butyl methacrylate | 330 | 495 |
| HEMA | — | 180 |
| glycidyl methacrylate | 1200 | 405 |
| ECHMMA | — | 900 |
| Polymerization initiator TBPO | 225 | 195 |
| Solvent | MEK | EGMM |
| Polymerization temperature (° C.) | 135 | 120 |
| Properties | | |
| Epoxy equivalence of the resin | 385 | 430 |
| Number average molecular weight of the resin | 2,300 | 2,600 |
| Non-volatile component of the solution (%) | 57.5 | 57.2 |

{Footnotes for Table 1}
Xy xylene
BuAc butyl acetate
MEK methyl ethyl ketone
EGMM ethylene glycol monomethyl ether
2EHA 2-ethylhexylacrylate
HEMA 2-hydroxyethyl methacrylate
ECHMMA 3,4-epoxycyclohexylmethyl methacrylate
TBPO tert-butylperoxyoctoate
DTBP di-tert-butylperoxide
Solvesso 150 a mixed hydrocarbon based solvent containing aromatic hydrocarbons, manufactured by Exxon Corporation, United States of America

Reference Example 7 (Preparation of a Main Constituent Polyester Resin (A))

In a reaction vessel equipped with a stirrer, a thermometer, a fractionating column and a nitrogen gas inlet was placed 150 parts of ethylene glycol, 840 parts of neopentyl glycol and 165 parts of cyclohexanedimethanol, and the temperature was raised to 150° C. with continuous stirring, under an atmosphere of nitrogen. Next, 345 parts of isophthalic acid, 1500 parts of terephthalic acid and 2 parts of dibutyl tin oxide were added, and the temperature was raised to 240° C. with continuous stirring.

At this temperature, the dehydration condensation reaction was allowed to continue until the acid value of the resin reached 12 (mgKOH/g) and the hydroxyl value reached 26 (mg-KOH/g), and subsequent cooling of the reaction mixture and addition of 3000 parts of xylene yielded a solution of a main constituent polyester resin (A-7) with a number average molecular weight of 2,900. Hereafter this solution is abbreviated as (A'-7). The properties of the solution are shown in Table 2(1).

Reference Examples 8, 9 (As Above)

With the exception of the alterations in the raw materials shown in Table 2, solutions (A'-8), (A'-9) of main constituent polyester resins with the properties shown in Table 2(1) and Table 2(2) were obtained using the same method described in the reference example 7.

Reference Example 10 (As Above)

In a reaction vessel equipped with a stirrer, a thermometer, a fractionating column and a nitrogen gas inlet was placed 180 parts of ethylene glycol, 876 parts of neopentyl glycol and 135 parts of hydrogenated bisphenol A, and the temperature was raised to 150° C. with continuous stirring, under an atmosphere of nitrogen. Next, 1500 parts of terephthalic acid, 300 parts of hexahydrophthalic anhydride, 9 parts of trimethylolpropane and 2 parts of dibutyl tin oxide were added, and the temperature was raised to 240° C. with continuous stirring.

At this temperature, the dehydration condensation reaction was allowed to continue until the hydroxyl value reached 35 (mgKOH/g), and the reaction mixture was then cooled and removed. The removed main constituent polyester resin (A-10) was subsequently cooled to room temperature, and then crushed. Dissolving 1350 parts of this main constituent polyester resin (A-10) in 1650 parts of ethyl acetate yielded a solution (A-10') of the main constituent polyester resin (A-10) with a number average molecular weight of 3,200. The properties of the solution are shown in Table 2(2).

TABLE 2(1)

|  | Reference Example | |
|---|---|---|
|  | 7 | 8 |
| Name of main constituent resin solution | A'-7 | A'-8 |
| isophthalic acid | 345 | — |
| terephthalic acid | 1500 | 1710 |
| cyclohexanedicarboxylic acid | — | 225 |
| ethylene glycol | 150 | 120 |
| neopentyl glycol | 840 | 936 |
| cyclohexanedimethanol | 165 | — |
| trimethylolpropane | — | 9 |
| Solvent | xylene | MIBK |
| Properties |  |  |
| Acid value of the rein | 12 | 31 |
| Hydroxyl value of the resin | 26 | — |
| Number average molecular weight of the resin | 2,900 | 3,700 |
| Non-volatile component of the solution (%) | 50.1 | 49.8 |

TABLE 2(2)

|  | Reference Example | |
|---|---|---|
|  | 9 | 10 |
| Name of main constituent resin solution | A'-9 | A'-10 |
| isophthalic acid | 450 | — |
| terephthalic acid | 1440 | 1500 |
| hexahydrophthalic anhydride | — | 300 |
| ethylene glycol | 240 | 180 |
| neopentyl glycol | 855 | 876 |
| hydrogenated bisphenol A | — | 135 |
| trimethylolpropane | 15 | 9 |
| Solvent | xylene/cyclohexanone = 5/5 | ethyl acetate |
| Properties |  |  |
| Hydroxyl value of the resin | 27 | 35 |
| Number average molecular weight of the resin | 4,200 | 3,200 |
| Non-volatile component of the solution (%) | 50.3 | 45.1 |

MIBK methyl isobutyl ketone

Reference Example 11 (Preparation of a Flow Regulator with a Curable Reactive Group)

In a reaction vessel equipped with a stirrer, a thermometer, a condenser and a nitrogen gas inlet was placed 450 parts of xylene, and the temperature was raised to 120° C. under an atmosphere of nitrogen. A mixture of 300 parts of 2-ethylhexylacrylate, 100 parts of n-butyl methacrylate, 300 parts of glycidyl methacrylate, 10 parts of tert-butylperoxyoctoate and 200 parts of xylene was then dripped into the reaction vessel over a period of six hours. Following completion of the addition, the same temperature was maintained for a further five hours to complete the polymerization reaction, and yielded a solution (L') (non-volatile component 60.8%) of an epoxy group containing flow regulator (L) with an epoxy equivalence of 480 (g/equivalent) and a number average molecular weight of 4,500.

Reference Example 12 (Preparation of a Powder Coating Raw Materials Solution)

In a reaction vessel equipped with a stirrer, a thermometer, a condenser and a nitrogen gas inlet was placed 1454 parts of methyl ethyl ketone, and to this solvent was added, with constant stirring, 156 parts of "B1530" (a blocked isocyanate compound manufactured by Huels of Germany), 25 parts of "Cymel 300" (hexamethoxymethylol melamine manufactured by Mitsui Cyanamid Ltd.), 2 parts of dibutyl tin laurate, 5 parts of benzoin and 2 parts of KP322 (a silicone based flow regulator manufactured by Shin-Etsu Chemical Ltd.), together with 3.2 parts of "Solvesso 100" (a mixed hydrocarbon based solvent containing aromatic hydrocarbons, manufactured by Exxon Corporation, United States of America) as the high boiling point solvent (C1). Subsequently, 1536 parts of the main constituent acrylic resin solution (A'-1) obtained in the reference example 1 was also added, and the resulting mixture was stirred further to yield a powder coating raw materials solution (S-1) which was uniform and transparent at room temperature. The properties of this solution (S-1) are shown in Table 4(1).

Reference Examples 13 to 16 (As Above)

With the exception of the alterations in the main constituent resin solution, the curing agent, the various additives and the diluting solvent shown in Table 3(1) and Table 3(2), powder coating raw materials solutions (S-2) to (S-5) were obtained using the same method described in the reference example 12. The properties of each solution are summarized in Table 4(1) and Table 4(2).

Reference Example 17 (Preparation of a Powder Coating Raw Materials Solution with Dispersed Pigment)

To 1352 parts of the main constituent acrylic resin solution (A'-6) produced in the reference example 6 was added 430 parts of "Tipaque CR-90" (rutile type titanium dioxide manufactured by Ishihara Sangyo Kaisha, Ltd.), and a white colored pigment dispersed resin solution was then prepared by dispersing the pigment with a sand mill.

Subsequently, in a reaction vessel equipped with a stirrer, a thermometer, a condenser and a nitrogen gas inlet was placed 2000 parts of methyl ethyl ketone, 479 parts of methyl isobutyl ketone and 275 parts of isobutanol, and to this solvent mixture was added, with constant stirring, 87 parts of "B1530", 188 parts of dodecanedioic acid, 5 parts of benzoin and 5 parts of "Acronal 4F" (a flow regulator manufactured by BASF Corporation of Germany), together with 3.0 parts of "IP Solvent 2028" as the high boiling point solvent (C1). Subsequent addition of the prepared white colored pigment dispersed resin solution, and further stirring yielded a colored powder coating raw materials solution (S-6). The properties of the solution (S-6) are shown in Table 4(3).

Reference Examples 18, 19

A main constituent acrylic resin was prepared in the same manner as the reference example 6, and with the exception of the alterations in the dispersed pigment shown in Table 3(3), powder coating raw materials solutions (S-7), (S-8) were obtained using the same method described in the reference example 17. The properties of these solutions are shown in Table 4(3).

Reference Examples 20 to 23 (As Above)

With the exception of the alterations in the main constituent resin solution, the curing agent, the pigment, the various additives and the diluting solvent shown in Table 3(4) and Table 3(5), powder coating raw materials solutions (S-9) to (S-12) were obtained using the same method described in the reference example 17. The properties of each solution are summarized in Table 4(4) and Table 4(5).

TABLE 3(1)

|  | Reference Example | | |
|---|---|---|---|
|  | 12 | 13 | 14 |
| Name of powder coating raw materials solution | S-1 | S-2 | S-3 |
| Main constituent resin solution | | | |
| A'-1 | 1536 | — | — |
| A'-2 | — | 1719 | — |
| A'-3 | — | — | 1425 |
| Curing agent | | | |
| B1530 | 156 | — | — |
| TGIC | — | 83 | — |
| dodecanedioic acid | — | — | 242 |
| Cymel 300 | 25 | — | — |
| Catalyst | | | |
| dibutyl tin laurate | 2 | — | — |
| Additives | | | |
| benzoin | 5 | 5 | 5 |
| KP322 | 2 | 2 | 2 |
| flow regulator (L') | — | — | 35 |
| Diluting solvent | | | |
| acetone | — | 475 | — |
| methyl ethyl ketone | 1454 | 1108 | 264 |
| isopropanol | — | — | 1057 |
| High boiling point solvent (C1) | | | |
| Solvesso 100 | 3.2 | | |
| Solvesso 150 | | | 1.1 |
| ethyl carbitol | | 0.5 | |

TABLE 3(2)

|  | Reference Example | |
|---|---|---|
|  | 15 | 16 |
| Name of powder coating raw materials solution | S-4 | S-5 |
| Main constituent resin solution | | |
| A'-4 | 1468 | — |
| A'-5 | — | 1453 |
| Curing agent | | |
| B1530 | — | — |
| dodecanedioic acid | 213 | 225 |
| Additives | | |
| benzoin | 5 | 5 |
| KP322 | 2 | 2 |

TABLE 3(2)-continued

|  | Reference Example | |
|---|---|---|
|  | 15 | 16 |
| Diluting solvent | | |
| methyl ethyl ketone | 601 | — |
| methyl isobutyl ketone | — | 367 |
| butyl acetate | 79 | — |
| methanol | — | 245 |
| isopropanol | 901 | 611 |
| High boiling point solvent (C1) | | |
| IP Solvent 1620 | — | 3.2 |

TABLE 3(3)

|  | Reference Example | | |
|---|---|---|---|
|  | 17 | 18 | 19 |
| Name of powder coating raw materials solution | S-6 | S-7 | S-8 |
| Main constituent resin solution | | | |
| A'-6 | 1352 | 1352 | 1352 |
| Curing agent | | | |
| B1530 | 87 | 87 | 87 |
| dodecanedioic acid | 188 | 188 | 188 |
| Pigment | | | |
| CR-90 | 430 | — | — |
| FASTOGEN Blue NK | — | 111 | — |
| MA100 | — | — | 53 |
| Additives | | | |
| benzoin | 5 | 5 | 5 |
| acronal 4F | 5 | 5 | 5 |
| Diluting solvent | | | |
| methyl ethyl ketone | 2000 | 2000 | 2000 |
| methyl isobutyl ketone | 479 | 479 | 479 |
| isopropanol | 275 | 275 | 275 |
| High boiling point solvent (C1) | | | |
| IP Solvent 2028 | 3.0 | 3.0 | 3.0 |

TABLE 3(4)

|  | Reference Example | |
|---|---|---|
|  | 20 | 21 |
| Name of powder coating raw materials solution | S-9 | S-10 |
| Main constituent resin solution | | |
| A'-7 | 1479 | — |
| A'-8 | — | 1673 |
| Curing agent | | |
| B1530 | 96 | — |
| epiclon 4050 | 163 | — |
| A-229-30 | — | 150 |
| XL-552 | — | 17 |

TABLE 3(4)-continued

|  | Reference Example | |
|---|---|---|
|  | 20 | 21 |
| Catalyst | | |
| dibutyl tin laurate | 2 | — |
| Pigment | | |
| CR-90 | 430 | 430 |
| Additives | | |
| benzoin | 5 | 5 |
| acronal 4F | 5 | 5 |
| Diluting solvent | | |
| ethyl acetate | 2259 | 2167 |
| butyl acetate | 1000 | — |
| High boiling point solvent (C1) | | |
| Exxon Solvent No. 7 | 10.1 | |
| isophorone | | 0.2 |

TABLE 3(5)

|  | Reference Example | |
|---|---|---|
|  | 22 | 23 |
| Name of powder coating raw materials solution | S-11 | S-12 |
| Main constituent resin solution | | |
| A'-9 | 1759 | — |
| A'-10 | — | 1894 |
| Curing agent | | |
| B1530 | 115 | 103 |
| BF1540 | — | 43 |
| Catalyst | | |
| dibutyl tin laurate | 2 | 2 |
| Pigment | | |
| CR-90 | 430 | 430 |
| Additives | | |
| benzoin | 5 | 5 |
| acronal 4F | 5 | 5 |
| Diluting solvent | | |
| ethyl acetate | 2394 | 1493 |
| butyl acetate | 266 | — |
| isopropanol | — | 166 |
| High boiling point solvent (C1) | | |
| Solvesso 200 | 4.3 | |
| Isopar M | | 2.9 |

{Footnotes for Table 3}
B1530
"Vestagon B1530" (a blocked isocyanate compound produced by blocking a nurate form of isophorone diisocyanate with ε-caprolactam) manufactured by Huels Corporation of Germany.
BF1540
"Vestagon BF1540" (a blocked isocyanate compound produced by self blocking of isophorone diisocyanate using a urethodione linkage) manufactured by Huels Corporation of Germany.
TGIC
triglycidylisocyanurate
Epiclon 4050
an epoxy resin manufactured by Dainippon Ink and Chemicals Inc. (Ltd.)
A-229-30

TABLE 3(5)-continued an epoxy group containing acrylic resin manufactured by Dainippon Ink and Chemicals Inc. (Ltd.) "Finedic A-229-30"
XL-552
an acid amide compound manufactured by EMS Corporation of Switzerland "Primid XL-552"
Cymel 300
hexamethoxymethylated melamine/formaldehyde resin manufactured by Mitsui Cytec (Ltd.)
CR-90
rutile type titanium dioxide manufactured by Ishihara Sangyo Kaisha, Ltd. "Tipaque CR-90"
FASTOGEN Blue NK
a phthalocyanine based blue organic pigment manufactured by Dainippon Ink and Chemicals Inc. (Ltd.)
MA100
carbon black pigment manufactured by Mitsubishi Chemicals (Ltd.)
KP322
a silicon based flow regulator manufactured by Shin-Etsu Chemical (Ltd.)
Acronal 4F
a flow regulator manufactured by BASF Corporation of Germany.
Solvesso 100
a mixed hydrocarbon solvent containing aromatic hydrocarbons, manufactured by Exxon Corporation, United States of America
Solvesso 150
as above
Solvesso 200
as above
IP Solvent 1620
a mixed hydrocarbon based solvent containing aliphatic hydrocarbons, manufactured by Idemitsu petrochemicals (Ltd.)
IP Solvent 2028
as above
Exxon Solvent No. 7
a mixed hydrocarbon solvent containing aliphatic hydrocarbons, manufactured by Exxon Corporation, United States of America
Isopar M
as above

TABLE 4(1)

|  | Reference Example | | |
|---|---|---|---|
|  | 12 | 13 | 14 |
| Name of powder coating raw materials solution | S-1 | S-2 | S-3 |
| Properties | | | |
| Non-volatile component (%) | 33 | 31 | 35 |
| Proportion (%) of entire solution accounted for by solvents with boiling points of 100° C. or less | 69 | 68 | 69 |
| Amount (parts) of high boiling point solvent (C1) per 100 parts of solid matter within the powder coating raw materials solution | 0.1 | 0.05 | 0.1 |
| Weight ratio of the amount of alcohol of 4 or fewer carbon atoms relative to the amount of aliphatic dibasic acid | — | — | 4.4 |

TABLE 4(2)

|  | Reference Example | |
|---|---|---|
|  | 15 | 16 |
| Name of powder coating raw materials solution | S-4 | S-5 |
| Properties | | |
| Non-volatile component (%) | 32 | 36 |
| Proportion (%) of entire solution | 68 | 80 |

TABLE 4(2)-continued

| | Reference Example | |
|---|---|---|
| | 15 | 16 |
| accounted for by solvents with boiling points of 100° C. or less | | |
| Amount (parts) of high boiling point solvent (C1) per 100 parts of solid matter within the powder coating raw materials solution | 0.2 | 0.3 |
| Weight ratio of the amount of alcohol of 4 or fewer carbon atoms relative to the amount of aliphatic dibasic acid | 4.2 | 3.8 |

TABLE 4(3)

| | Reference Example | | |
|---|---|---|---|
| | 17 | 18 | 19 |
| Name of powder coating raw materials solution | S-6 | S-7 | S-8 |
| Properties | | | |
| Non-volatile component (%) | 30 | 26 | 25 |
| Proportion (%) of entire solution accounted for by solvents with boiling points of 100° C. or less | 60 | 60 | 60 |
| Amount (parts) of high boiling point solvent (C1) per 100 parts of solid matter within the powder coating raw materials solution | 0.2 | 0.3 | 0.3 |
| Weight ratio of the amount of alcohol of 4 or fewer carbon atoms relative to the amount of aliphatic dibasic acid | 4.6 | 4.6 | 4.6 |

TABLE 4(4)

| | Reference Example | |
|---|---|---|
| | 20 | 21 |
| Name of powder coating raw materials solution | S-9 | S-10 |
| Properties | | |
| Non-volatile component (%) | 27 | 32 |
| Proportion (%) of entire solution accounted for by solvents with boiling points of 100° C. or less | 56 | 72 |
| Amount (parts) of high boiling point solvent (C1) per 100 parts of solid matter within the powder coating raw materials solution | 0.7 | 0.01 |

TABLE 4(5)

| | Reference Example | |
|---|---|---|
| | 22 | 23 |
| Name of powder coating raw materials solution | S-11 | S-12 |
| Properties | | |
| Non-volatile component (%) | 29 | 35 |
| Proportion (%) of entire solution accounted for by solvents with boiling points of 100° C. or less | 68 | 99.9 |
| Amount (parts) of high boiling point solvent (C1) per 100 parts of solid matter within the powder coating raw materials solution | 0.3 | 0.2 |

Example 1

A powder coating was prepared in an explosion-proof vertical fall co-current type spray drying apparatus equipped with a solvent recovery apparatus, using a rotary disc system for the spray system. With the rotational speed of the rotary disc set at 15,000 rpm, and using nitrogen gas as the heat source gas, the raw materials solution and the heat source gas were brought into contact using a vertical fall co-current system. The temperature of the gas was set at 120° C. The powder coating raw materials solution (S-1), preheated to a temperature of 60° C., was sprayed into the spray drying apparatus with a supply speed of 0.5 kg/hr, and by using a cyclone to collect the particles of powder coating dried inside the apparatus, a powder coating with an average particulate diameter of 15 μm was obtained. The shape of the particles was substantially spherical. Furthermore, the non-volatile component of the obtained powder coating was 99.3%, and measurement of the amount of "Solvesso 100", the high boiling point solvent (C1), incorporated within the powder coating produced a value of 0.09% by weight.

Examples 2 to 12 (As Above)

With the exceptions of using the powder coating raw materials solutions (S-2) to (S-12) in place of the powder coating raw materials solution (S-1), and altering the preheated temperature of the powder coating raw materials solution and the temperature of the heat source gas as shown in Table 5(1) to Table 5(5), powder coatings (P-2) to (P-12) were obtained using the same method described in the example 1. In the case of the powder coatings (P-6) to (P-8), a secondary drying process was carried out by drying the paints for 8 hours at 60° C. in a vacuum dryer. The properties of the powder coatings are shown in Table 5(1) to Table 5(5).

Comparative Example 1

The powder coating raw materials solution (S-5) was prepared in the same manner as the reference example 16, and with the exception of altering the temperature of the heat source gas to 170° C., an attempt was made to prepare a powder coating in the same manner as the example 5, but the obtained particles gelled and agglomerated. The properties are shown in Table 5(6).

Comparative Example 2

With the exception of altering the amount of Solvesso 150 added during the preparation of the powder coating raw materials solution to 55 parts, a powder coating raw materials solution was prepared in the same manner as the reference example 14, and a powder coating was subsequently produced in the same manner as the example 3, but the drying of the powder coating was insufficient, and solid particles were not produced. A secondary drying process was then carried out by vacuum drying the paint for a further 8 hours at 60° C., but solid particles were still not obtained.

The properties are shown in Table 5(6).

TABLE 5(1)

| | Example | | |
|---|---|---|---|
| | 1 | 2 | 3 |
| Name of powder coating | P-1 | P-2 | P-3 |
| Powder coating raw materials solution | S-1 | S-2 | S-3 |
| Preheating temperature (° C.) | 60 | 40 | 35 |
| Heat source gas temperature (° C.) | 120 | 100 | 60 |
| Properties | | | |
| External appearance (visual inspection) | white colored granules | white colored granules | white colored granules |
| Non-volatile component of particles following spray drying (%) | 99.3 | 99.5 | 99.4 |
| Proportion of the high boiling point solvent (C1) (weight %) | 0.09 | 0.04 | 0.08 |

TABLE 5(2)

| | Example | |
|---|---|---|
| | 4 | 5 |
| Name of powder coating | P-4 | P-5 |
| Powder coating raw materials solution | S-4 | S-5 |
| Preheating temperature (° C.) | 40 | 25 |
| Heat source gas temperature (° C.) | 70 | 45 |
| Properties | | |
| External appearance (visual inspection) | white colored granules | white colored granules |
| Non-volatile component of particles following spray drying (%) | 99.5 | 99.5 |
| Proportion of the high boiling point solvent (C1) (weight %) | 0.18 | 0.27 |

TABLE 5(3)

| | Example | | |
|---|---|---|---|
| | 6 | 7 | 8 |
| Name of powder coating | P-6 | P-7 | P-8 |
| Powder coating raw materials solution | S-6 | S-7 | S-8 |
| Preheating temperature (° C.) | 40 | 40 | 40 |
| Heat source gas temperature (° C.) | 90 | 90 | 90 |
| Properties | | | |
| External appearance (visual inspection) | white colored granules | blue colored granules | black colored granules |
| Non-volatile component of particles following spray drying (%) | 99.5 | 99.5 | 99.4 |
| Non-volatile component of particles following secondary drying (vacuum drying) (%) | 99.5 | 99.6 | 99.6 |
| Proportion of the high boiling point solvent (C1) (weight %) | 0.19 | 0.28 | 0.27 |

TABLE 5(4)

| | Example | |
|---|---|---|
| | 9 | 10 |
| Name of powder coating | P-9 | P-10 |
| Powder coating raw materials solution | S-9 | S-10 |

TABLE 5(4)-continued

| | Example | |
|---|---|---|
| | 9 | 10 |
| Preheating temperature (° C.) | 40 | 45 |
| Heat source gas temperature (° C.) | 100 | 90 |
| Properties | | |
| External appearance (visual inspection) | white colored granules | white colored granules |
| Non-volatile component of particles following spray drying (%) | 99.1 | 99.2 |
| Non-volatile component of particles following secondary drying (vacuum drying) (%) | 99.4 | — |
| Proportion of the high boiling point solvent (C1) (weight %) | 0.65 | 0.01 |

TABLE 5(5)

| | Example | |
|---|---|---|
| | 11 | 12 |
| Name of powder coating | P-11 | P-12 |
| Powder coating raw materials solution | S-11 | S-12 |
| Preheating temperature (° C.) | 50 | 60 |
| Heat source gas temperature (° C.) | 110 | 120 |
| Properties | | |
| External appearance (visual inspection) | white colored granules | white colored granules |
| Non-volatile component of particles following spray drying (%) | 99.2 | 99.4 |
| Proportion of the high boiling point solvent (C1) (weight %) | 0.29 | 0.19 |

TABLE 5(6)

| | Comparative Example | |
|---|---|---|
| | 1 | 2 |
| Powder coating raw materials solution | S-5 | S-3 |
| Preheating temperature (° C.) | 25 | 60 |
| Heat source gas temperature (° C.) | 170 | 120 |
| Properties | | |
| External appearance (visual inspection) | gelled particles | viscous liquid |
| Non-volatile component of particles following spray drying (%) | 99.7 | 94.3 |
| Non-volatile component of particles following secondary drying (vacuum drying) (%) | — | 94.5 |
| Proportion of the high boiling point solvent (C1) (weight %) | 0.17 | 4.8 |

Comparative Reference Example 1 (Preparation of a Transparent Top Coat Paint (II) by a Conventional Production Method)

1536 parts of the main constituent acrylic resin solution (A'-5) obtained from the reference example 5 was placed under reduced pressure and the solvent removed at 150° C. and 30 hPa to yield the main constituent acrylic resin (A-5).

The thus obtained main constituent acrylic resin (A-5) was subjected to coarse crushing, and was subsequently dry blended with a curing agent, a catalyst and additives, using the same mixing proportions as the reference example 16, before being subjected to molten mixing using a "Cokneader PR-46" (an extrusion mixing device manufactured by Buss Corporation of Switzerland). Following cooling, the mixture was crushed and passed through a 150 mesh sieve, with the powdered fraction which passed through the sieve being collected as a transparent top coat paint (P-15).

Comparative Reference Example 2 (Preparation of a Powder Coating by a Conventional Production Method)

1352 parts of the main constituent acrylic resin solution (A'-6) obtained in the same manner as the reference example 6 was placed under reduced pressure and the solvent removed at 150° C. and 30 hPa to yield the main constituent acrylic resin (A-6). The thus obtained main constituent acrylic resin (A-6) was subjected to coarse crushing, and was subsequently dry blended with curing agents, a catalyst, a pigment, additives and a high boiling point solvent (C1) using the same mixing proportions as the reference example 17, before being subjected to molten mixing using a "Cokneader PR-46" (an extrusion mixing device manufactured by Buss Corporation of Switzerland). Following cooling, the mixture was crushed and passed through a 150 mesh sieve, with the powdered fraction which passed through the sieve being collected as a powder coating (P-16).

Comparative Reference Example 3

The main constituent acrylic resin (A-6) was prepared in the same manner as the comparative reference example 2, and was subsequently dry blended with curing agents, a catalyst, a pigment and additives using the same mixing proportions as the reference example 18, before being subjected to molten mixing using a "Cokneader PR-46" (an extrusion mixing device manufactured by Buss Corporation of Switzerland). Following cooling, the mixture was crushed and passed through a 150 mesh sieve, with the powdered fraction which passed through the sieve being collected as a powder coating (P-17).

Comparative Reference Example 4

The main constituent acrylic resin (A-6) was prepared in the same manner as the comparative reference example 2, and was subsequently dry blended with curing agents, a catalyst, a pigment and additives using the same mixing proportions as the reference example 19, before being subjected to molten mixing using a "Cokneader PR-46" (an extrusion mixing device manufactured by Buss Corporation of Switzerland). Following cooling, the mixture was crushed and passed through a 150 mesh sieve, with the powdered fraction which passed through the sieve being collected as a powder coating (P-18).

Comparative Reference Example 5 (As Above)

384 parts of the main constituent polyester resin (A-10) obtained in the reference example 10 was dry blended with curing agents, a catalyst, a pigment and additives using the same mixing proportions as the reference example 23, before being subjected to molten mixing using a "Cokneader PR-46" (an extrusion mixing device manufactured by Buss Corporation of Switzerland). Following cooling, the mixture was crushed and passed through a 150 mesh sieve, with the powdered fraction which passed through the sieve being collected as a powder coating (P-19).

Reference Example 24 (Preparation of a Colored Base Coat Paint [I])

(Preparation of a Water Based Resin [W])

In a reaction vessel equipped with a stirrer, a thermometer, a condenser and a nitrogen gas inlet was placed 680 parts of deionized water, 2 parts of ammonium persulfate and 15 parts of "Triton X-200" (the brand name of an anionic surfactant manufactured by Rohm and Haas Ltd. of America) and the temperature was raised to 95° C. An aqueous emulsion of the acrylic monomer constituents described below was then dripped into this 95° C. reaction system over a period of four hours, and following completion of the addition, the same temperature was maintained for a further three hours. The reaction solution was subsequently cooled, and 5 parts of dimethyl ethanolamine and 40 parts of deionized water was added. This yielded a stable milky colored dispersion of a water based acrylic resin with a solid matter proportion of 45%. This dispersion is abbreviated as the water based resin [W].

Acrylic Monomer Constituents
  methyl methacrylate 450 parts
  ethyl acrylate 350 parts
  2-hydroxyethyl methacrylate 150 parts
  acrylic acid 20 parts
  ethylene glycol di-methacrylate 30 parts
  n-octyl mercaptan 5 parts
  ammonium persulfate 4 parts
  Triton X-200 15 parts
    (an anionic surfactant manufactured by Rohm and Haas Ltd. of America)
  Emulgen 840s 10 parts
    (a nonioninc surfactant manufactured by Kao Atlas Ltd.)
    deionized water 530 parts (Preparation of a Thickener [AW])

To 64 parts of "Acrysol ASE-60" (a thickener manufactured by Rohm and Haas Ltd. of America: solid component 28%) were added 6 parts of dimethyl ethanolamine and 530 parts of deionized water, to yield the target thickener with a solid component of 3%. This thickener is abbreviated as [AW].

(Preparation of a Colored Base Coat Paint [I])

Into 100 parts of the water based resin [W] were mixed 10 parts of the thickener [AW], 5 parts of Cymel 300 (hexamethoxymethylated melamine manufactured by Mitsui Cyanamid), 1 part of paratoluenesulfonic acid, 3 parts of aluminum paste dispersion #4919 (an aluminum paste product manufactured by Toyo Aluminum (Ltd.)), 1.5 parts of aluminum paste dispersion #55–519 (manufactured by the same company) and 12 parts of isopropanol, and deionized water was then added to adjust the viscosity to 16 seconds (Ford cup No. 4/20° C.). This preparation is abbreviated as the colored base coat paint [I].

Example 15 (Preparation of a Powder Coating Containing a High Boiling Point Organic Solvent by a Conventional Production Method)

1352 parts of the main constituent acrylic resin solution (A'-6) obtained in the same manner as the reference example 6 was placed under reduced pressure and the solvent removed at 150° C. and 30 hPa to yield the main constituent acrylic resin (A-6). The thus obtained main constituent acrylic resin (A-6) was subjected to coarse crushing, and was subsequently dry blended with curing agents, a catalyst, a pigment and additives using the same mixing proportions as the reference example 17, before being subjected to molten mixing using a "Cokneader PR-46" (an extrusion mixing device manufactured by Buss Corporation of Switzerland) Following cooling, the mixture was crushed and passed through a 150 mesh sieve, with the powdered fraction which passed through the sieve being collected as a powder coating (P-20).

The powder coating (P-20) obtained above was applied by electrostatic painting to a zinc phosphate treated steel sheet of thickness 0.8 mm, to produce a paint film of thickness 60 $\mu$m. By baking and curing the painted test sheet at 160° C. for 20 minutes, a painted sheet was obtained. The properties of the thus obtained cured paint film are shown in Table 6(1).

Example 16

A white colored alkyd melamine solvent based paint was spray painted onto a zinc phosphate treated steel sheet of thickness 0.8 mm to produce a paint film of thickness 30 $\mu$m, and following baking and curing at 140° C. for 30 minutes, the powder coating (P-1) obtained from the example 1 above was applied thereon by electrostatic painting to produce a paint film of thickness 60 $\mu$m. By baking and curing the painted test sheet at 180° C. for 20 minutes, a painted sheet was obtained. The properties of the cured paint film are shown in Table 6(1).

Example 17 (Properties of Cured Paint Films of Powder Coatings Produced by a Production Method of the Present Invention)

Painted films were prepared using the colored base coat paint [I] and a transparent top coat paint, in accordance with the paint film formation method described below.

The material for use as the target object for painting comprised a sheet of "Bondelite #3030" (a soft steel sheet treated with a zinc phosphate based agent, manufactured by Nihon Parkerizing (Ltd.)) which had been coated with an epoxy resin based cationic electrodeposition paint by electrodeposition, and to which a melamine curing polyester resin based intermediate paint had then been applied. Onto this material was applied two coats of the colored base coat paint [I] obtained in the reference example 24, under a painting atmosphere including a temperature of 25° C. and a relative humidity of 65 to 70% and with each coat producing a dried paint film thickness of 20 $\mu$m, and the paint was then cured to produce a painted object with a plurality of layers of paint films. A two minute setting period was allowed between the two coats of paint. The air pressure of the spray gun during the painting of the first coat was 5 (Kg/cm$^2$) and the flow velocity of the paint was 400 (m/minute), whereas for the painting of the second coat, the flow velocity of the paint was reduced to 200 (m/minute) and the distance between the target object for painting and the spray gun was set to 40 cm. The material was supported so that the paint application surface of the material was always perpendicular to the direction of the paint discharge.

Following the aforementioned two coats of paint, the painted object was air dried for 5 minutes at a temperature of 30° C., cooled again to room temperature, and then a transparent top coat of the powder coating (P-3) obtained in the example 3 was applied by electrostatic powder painting to produce a dried paint film thickness of 60 $\mu$m, which was then cured at 140° C. for 30 minutes.

The multiple layer powder coating film thus obtained was then evaluated in terms of the external appearance of the paint film. The results are summarized in Table 6(2).

Example 18 (As Above)

With the exceptions of altering the powder coating and the baking temperature used as shown in Table 6(2), a painted sheet was prepared in the same manner as the example 17. The properties of the thus obtained cured paint film are shown in Table 6(2).

Example 19

The powder coating (P-9) obtained in the example 9 was applied by electrostatic painting to a zinc phosphate treated steel sheet of thickness 0.8 mm, to produce a paint film of thickness 60 $\mu$m. By baking and curing the painted test sheet at 200° C. for 20 minutes, a painted sheet was obtained. The properties of the thus obtained cured paint film are shown in Table 6(3).

Example 20

With the exceptions of altering the powder coating and the baking temperature used as shown in Table 6(3), a painted sheet was prepared in the same manner as the example 19. The properties of the thus obtained cured paint film are shown in Table 6(3).

Comparative Example 3

With the exception of altering the powder coating used as shown in Table 6(4), a painted sheet was prepared in the same manner as the example 17. The properties of the thus obtained cured paint film are shown in Table 6(4).

Comparative Example 4

With the exception of altering the powder coating used as shown in Table 6(4), a painted sheet was prepared in the same manner as the example 19. The properties of the thus obtained cured paint film are shown in Table 6(4).

TABLE 6(1)

|  |  |  | Example | |
| --- | --- | --- | --- | --- |
|  |  |  | 15 | 16 |
| Powder coating |  |  | P-20 | P-1 |
| Baking temperature (° C.) |  |  | 160 | 180 |
| Properties |  |  |  |  |
| External appearance | Visual inspection | Smoothness | B | A |
|  |  | Existence of paint film defects | A | A |
|  | 60 degree luster |  | 91 | 92 |

TABLE 6(2)

|  |  |  | Example | |
| --- | --- | --- | --- | --- |
|  |  |  | 17 | 18 |
|  | Powder coating |  | P-3 | P-5 |
|  | Baking temperature (° C.) |  | 140 | 140 |
| Properties |  |  |  |  |
| External appearance | Visual inspection | Smoothness | A | A |
|  |  | Existence of paint film defects | A | A |
|  | 60 degree luster |  | 94 | 93 |

TABLE 6(3)

|  |  |  | Example | |
|---|---|---|---|---|
|  |  |  | 19 | 20 |
| Powder coating |  |  | P-9 | P-10 |
| Baking temperature (° C.) |  |  | 200 | 180 |
| Properties |  |  |  |  |
| External appearance | Visual inspection | Smoothness | A-B | A-B |
|  |  | Existence of paint film defects | A | A |
|  |  | 60 degree luster | 91 | 90 |

TABLE 6(4)

|  |  |  | Comparative Example | |
|---|---|---|---|---|
|  |  |  | 3 | 4 |
| Powder coating |  |  | P-16 | P-19 |
| Baking temperature (° C.) |  |  | 140 | 200 |
| Properties |  |  |  |  |
| External appearance | Visual inspection | Smoothness | B-C | B-C |
|  |  | Existence of paint film defects | A | B |
|  |  | 60 degree luster | 87 | 85 |

{Footnotes for Table 6}
Existence of paint film defects
Determined based on the number of paint film defects such as bubbles, indentations or pinholes (per 100 cm² of painted sheet) on the paint film surface
A: zero defects
B: 1 to 2 defects
C: 3 to 10 defects
D: >10 defects Reference Example 25 [Preparation of a Standard Color Powder Coating (PC-1)]

With the exception of altering the pigment used to a mixture of 300.7 parts of "CR-90" and 33.4 parts of "FASTOGEN Blue NK", a standard color powder coating (PC-1) was prepared in the same manner as the comparative reference example 2. The thus obtained standard color powder coating (PC-1) was then used to prepare a painted sheet in the same manner as the example 19.

Reference Example 26 [Preparation of a Standard Color Powder Coating (PC-2)]

With the exception of altering the pigment used to a mixture of 301.9 parts of "Cr-90" and 15.9 parts of "MA100", a standard color powder coating (PC-2) was prepared in the same manner as the comparative reference example 2. The thus obtained standard color powder coating (PC-2) was then used to prepare a painted sheet in the same manner as the example 19.

Example 21 (Preparation of a Color Adjusted Colored Powder Coating Using a Production Method of the Present Invention)

Powder coating raw materials solutions (S-6) and (S-7) were prepared in the same manner as the reference examples 17, 18, and a powder coating raw materials solution (S-15) was then prepared by mixing the solutions using a (S-6)/(S-7) ratio of 713/287 (pigment mixing ratio: "CR-90"/ "Fastogen Blue NK" 90/10). This powder coating raw materials solution (S-15) was spray dried in the same manner as the example 6 to yield a colored powder coating (P-21). Using the thus obtained powder coating (P-21), a painted sheet was prepared in the same manner as the example 19. The result of a comparison of the color of the thus obtained paint film with the paint film of the standard color powder coating (PC-1) prepared in the reference example 25 is shown in Table 7(1).

Comparative Example 5 (Preparation of a Color Adjusted Colored Powder Coating Using a Dry Blending Method)

The powder coatings (P-16) and (P-17) obtained from the comparative reference examples 2, 3 were dry blended in a (P-16)/(P-17) ratio of 747/253 to produce a colored powder coating (P-22). Using the thus obtained powder coating (P-22), a painted sheet was prepared in the same manner as the example 19. The thus obtained paint film had a mottled appearance, and a paint film of a uniform color was not obtainable. The result of a comparison with the paint film of the standard color powder coating (PC-1) prepared in the reference example 25 is shown in Table 7(1).

Example 22

Powder coating raw materials solutions (S-6) and (S-8) were prepared in the same manner as the reference examples 17, 19, and a powder coating raw materials solution (S-16) was then prepared by mixing the solutions using a (S-6)/(S-8) ratio of 718/282 (pigment mixing ratio: "CR-90"/ "MA100"=95/5). This powder coating raw materials solution (S-16) was spray dried in the same manner as the example 6 to yield a colored powder coating (P-23).

Using the thus obtained powder coating (P-23), a painted sheet was prepared in the same manner as the example 19. The result of a comparison of the color of the thus obtained paint film with the paint film of the standard color powder coating (PC-2) prepared in the reference example 26 is shown in Table 7(2).

Comparative Example 6

The powder coatings (P-16) and (P-18) obtained from the comparative reference examples 2, 4 were dry blended in a (P-16)/(P-18) ratio of 758/242 (pigment mixing ratio: "CR-90"/"MA100"=95/5) to produce a colored powder coating (P-24). Using the thus obtained powder coating (P-24), a painted sheet was prepared in the same manner as the example 19. The thus obtained paint film had a mottled appearance, and a paint film of a uniform color was not obtainable. The result of a comparison with the paint film of the standard color powder coating (PC-2) prepared in the reference example 26 is shown in Table 7(2).

TABLE 7(1)

|  |  |  | Example 21 | Comparative Example 5 |
|---|---|---|---|---|
| Powder coating |  |  | P-21 | P-22 |
| Baking temperature (° C.) |  |  | 180 | 180 |
| Properties |  |  |  |  |
| External appearance | Visual inspection | Smoothness | A-B | C |
|  |  | Existence of paint film defects | A | B |
|  |  | 60 degree luster | 90 | 75 |
|  | Color difference compared with standard paint (PC-1) |  | A | D |

TABLE 7(2)

|  |  |  | Example 22 | Comparative Example 6 |
|---|---|---|---|---|
| Powder coating |  |  | P-23 | P-24 |
| Baking temperature (° C.) |  |  | 180 | 180 |
| Properties |  |  |  |  |
| External appearance | Visual inspection | Smoothness | A-B | C |
|  |  | Existence of paint film defects | A | B |
|  | 60 degree luster |  | 88 | 66 |
| Color difference compared with standard paint (PC-2) |  |  | A | D |

{Footnotes for Table 7}
Existence of paint film defects
Determined based on the number of paint film defects such as bubbles, indentations or pinholes (per 100 cm² of painted sheet) on the paint film surface
A: zero defects
B: 1 to 2 defects
C: 3 to 10 defects
D: >10 defects
Color difference compared with standard paint
Determined based on a visual inspection of the color of the paint film
A: uniform color, with no discernible difference from standard paint
B: uniform color, but comparison with standard paint reveals a color difference
C: irregularity apparent in color, and large difference in color from standard paint
D: two colored mottled appearance, and markedly large difference in color from standard paint

INDUSTRIAL APPLICABILITY

As described above, a production method for a powder coating of the present invention is a highly practical method which does not require the type of long complicated production processes associated with conventional methods of producing powder coatings, and which enables the production to be completed easily and at low cost, and moreover with no danger of gelling occurring during the production process. A powder coating of the present invention is capable of forming a paint film with superior smoothness, and particularly for powder coatings produced using an organic solvent (C) incorporating a high boiling point organic solvent (C1) with a boiling point of 150 to 300° C., a paint film can be formed which has no paint film defects such as bubbles and pin holes and the like. In addition, according to a paint film formation method of the present invention, by using a powder coating of the present invention as a top coat paint, a paint film with superior smoothness can be obtained.

What is claimed is:

1. A method of producing a powder coating, wherein a powder coating raw materials solution comprising as essential constituents a room temperature solid main constituent resin (A) with a curable reactive group, a room temperature solid curing agent (B) which reacts with said curable reactive group of said main constituent resin (A), and an organic solvent (C) incorporating a high boiling point organic solvent (C1) with a boiling point at atmospheric pressure of 150 to 300° C., is spray dried at a temperature at which said main constituent resin (A) and said curing agent (B) undergo no substantial curing reaction, an moreover under conditions where either one of a portion of, and all of, said high boiling point organic solvent (C1) remains, yielding a powder coating in which a percentage content of said high boiling point organic solvent (C1) is from 0.005 to 1% by weight, and wherein the amount of said high boiling point organic solvent (C1) used is from 0.005 to 1 part by weight relative to 100 parts of solid matter in the powder coating raw materials solution.

2. A method of producing a powder coating according to claim 1, wherein said powder coating raw materials solution utilizes a raw materials solution comprising as essential constituents, a room temperature solid main constituent resin (A) with a curable reactive group, a room temperature solid curing agent (B) which reacts with said curable reactive group of said main constituent resin (A), an organic solvent (C) incorporating a high boiling point organic solvent (C1) with a boiling point at atmospheric pressure of 150 to 300° C., and a pigment (D).

3. A method of producing a powder coating according to claim 2, wherein spray drying is performed following color adjustment of said powder coating raw materials solution.

4. A method of producing a powder coating, wherein a powder coating raw materials solution comprising as essential constituents a room temperature solid main constituent resin (A) with a curable reactive group, a room temperature solid curing agent (B) which reacts with said curable reactive group of said main constituent resin (A), and an organic solvent (C) incorporating a high boiling point organic solvent (C1) with a boiling point at atmospheric pressure of 150 to 300° C., is spray dried at a temperature at which said main constituent resin (A) and said curing agent (B) undergo no substantial curing reaction, and moreover under conditions where either one of a portion of, and all of, said high boiling point organic solvent (C1) remains, yielding a powder coating in which a percentage content of said high boiling point organic solvent (C1) is from 0.005 to 1% by weight, and wherein organic solvent with a boiling point at atmospheric pressure of no more than 100° C. accounts for at least 65% by weight of said organic solvent (C).

5. A method of producing a powder coating according to claim 1, wherein said curable reactive group of said main constituent resin (A) is at least one group selected from a group consisting of epoxy groups, carboxyl groups and hydroxyl groups.

6. A method of producing a powder coating according to claim 1, wherein at least one curable reactive group of said main constituent resin (A) is an epoxy group, and said curing agent (B) is an aliphatic dibasic acid.

7. A method of producing a powder coating according to claim 6, wherein said aliphatic dibasic acid is dodecanedioic acid.

8. A method of producing a powder coating according to claim 6, wherein said organic solvent (C) incorporates an alcohol of 4 carbon atoms or fewer, and amount of said alcohol of 4 carbon atoms or fewer, relative to an amount of said aliphatic dibasic acid incorporated within said powder coating raw materials solution, is a weight ratio of at least four fold.

9. A method of producing a powder coating according to claim 1, wherein said powder coating raw materials solution is spray dried at 40 to 130° C.

10. A powder coating comprising a room temperature solid main constituent resin (A) with a curable reactive group, a room temperature solid curing agent (B) which reacts with said curable reactive group of said main constituent resin (A), and a high boiling point organic solvent (C1) with a boiling point at atmospheric pressure of 150 to 300° C., wherein a proportion of said high boiling point organic solvent (C1) is from 0.005 to 1% by weights, wherein at least one curable reactive group of said main constituent resin (A) is an epoxy group, and said curing agent (B) is an aliphatic dibasic acid.

11. A powder coating according to claim 10 comprising a room temperature solid main constituent resin (A) with a curable reactive group, a room temperature solid curing agent (B) which reacts with said curable reactive group of said main constituent resin (A), a high boiling point organic solvent (C1) with a boiling point at atmospheric pressure of 150 to 300° C., and a pigment (D).

12. A method of forming either one of a single layer and a multiple layer paint film on a target object for painting, wherein a powder coating (X1) produce by a production method according to claim 1 is used as a top coat paint.

13. A method of forming a paint film according to claim 12, wherein a base coat paint [I] is applied to said target object for painting, and a top coat paint [II] is applied thereon, and said powder coating (X1) is used as said top coat paint [II].

14. A method of forming a paint film according to claim 13, wherein said base coat paint [I] is a colored base coat paint, and said top coat paint [II] is a transparent top coat paint.

15. A method of forming either one of a single layer and a multiple layer paint film on a target object for painting, wherein a powder coating (X2) according to claim 10 is used as a top coat paint.

16. A method of forming a paint film according to claim 15, wherein a base coat paint [I] is applied to said target object for painting, and a top coat paint [II] is applied thereon, and said powder coating (X2) is used as said top coat paint [II].

17. A method of forming a paint film according to claim 16, wherein said base coat paint [I] is a colored base coat paint, and said top coat paint [II] is a transparent top coat paint.

* * * * *